(12) United States Patent
Malwankar et al.

(10) Patent No.: US 10,289,507 B1
(45) Date of Patent: May 14, 2019

(54) DISTRIBUTED REBUILD OF FAILED STORAGE DEVICE

(71) Applicant: Pavilion Data Systems, Inc., San Jose, CA (US)

(72) Inventors: Kiron Balkrishna Malwankar, Saratoga, CA (US); Karagada Ramarao Kishore, Saratoga, CA (US); Sundar Kanthadai, Fremont, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 239 days.

(21) Appl. No.: 15/335,306

(22) Filed: Oct. 26, 2016

Related U.S. Application Data

(60) Provisional application No. 62/247,128, filed on Oct. 27, 2015.

(51) Int. Cl.
*G06F 11/00* (2006.01)
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0635* (2013.01); *G06F 3/0689* (2013.01); *G06F 2201/805* (2013.01)

(58) Field of Classification Search
CPC .. G06F 11/2094; G06F 3/0619; G06F 3/0635; G06F 3/0689; G06F 2201/805
See application file for complete search history.

(56) References Cited

U.S. PATENT DOCUMENTS

| | | | | |
|---|---|---|---|---|
| 5,274,645 | A * | 12/1993 | Idleman | G06F 11/10 714/6.1 |
| 5,566,316 | A * | 10/1996 | Fechner | G06F 11/1662 711/114 |
| 6,151,641 | A * | 11/2000 | Herbert | G06F 3/0607 710/22 |
| 6,370,605 | B1 * | 4/2002 | Chong, Jr. | G06F 3/0613 710/33 |
| 6,457,098 | B1 * | 9/2002 | DeKoning | G06F 3/061 711/114 |
| 7,739,544 | B2 * | 6/2010 | Yamato | G06F 11/1092 714/6.32 |
| 7,904,749 | B2 * | 3/2011 | Kawaguchi | G06F 11/1076 714/2 |
| 9,081,828 | B1 * | 7/2015 | Martin | G06F 11/201 |
| 9,384,093 | B1 * | 7/2016 | Aiello | G06F 3/0688 |
| 2003/0191921 | A1 * | 10/2003 | Hauck | G06F 11/2089 711/202 |
| 2008/0005410 | A1 * | 1/2008 | Mies | G06F 3/0614 710/62 |

(Continued)

*Primary Examiner* — Marc Duncan
*Assistant Examiner* — Jonathan D Gibson
(74) *Attorney, Agent, or Firm* — Lowenstein Sandler LLP

(57) ABSTRACT

A storage server comprises a plurality of storage devices arranged in a redundant storage array and a plurality of controllers. One of the controllers determines that a storage device in the redundant storage array has failed, determines a first portion of the storage device to be recovered by a first controller and determines a second portion of the storage device to be recovered by a second controller. The first controller recovers the first portion of the storage device and the second controller recovers the second portion of the storage device.

22 Claims, 8 Drawing Sheets

(56) References Cited

U.S. PATENT DOCUMENTS

| | | | |
|---|---|---|---|
| 2009/0327802 A1* | 12/2009 | Fukutomi | G06F 11/1068 714/6.2 |
| 2011/0066802 A1* | 3/2011 | Kawaguchi | G06F 3/0605 711/114 |
| 2011/0167216 A1* | 7/2011 | Huang | G06F 11/1076 711/114 |
| 2011/0246716 A1* | 10/2011 | Frame | G06F 3/0689 711/114 |
| 2013/0054891 A1* | 2/2013 | Kawaguchi | G06F 11/1092 711/114 |
| 2014/0025990 A1* | 1/2014 | Akutsu | G06F 11/1092 714/6.22 |
| 2015/0006716 A1* | 1/2015 | Suchter | G06F 9/5038 709/224 |
| 2015/0301749 A1* | 10/2015 | Seo | G06F 3/0611 714/6.24 |
| 2016/0092109 A1* | 3/2016 | Wu | G06F 3/061 711/114 |
| 2016/0188424 A1* | 6/2016 | Walls | G06F 11/1662 714/6.3 |
| 2017/0097773 A1* | 4/2017 | Camp | G06F 12/1009 |

* cited by examiner

US 10,289,507 B1

DISTRIBUTED REBUILD OF FAILED STORAGE DEVICE

RELATED APPLICATIONS

The present application claims the benefit of U.S. Provisional Patent Application No. 62/247,128 filed Oct. 27, 2015, which is incorporated by reference herein.

FIELD OF TECHNOLOGY

This disclosure relates generally to the field of data storage and in particular to rebuilding a failed storage device using multiple different processing devices operating in parallel.

BACKGROUND

Networked storage arrays may provide an enterprise level solution for secure and reliable data storage. Storage devices in such storage arrays fail for various reasons. When a storage device in a storage array fails, the data from other storage devices in the storage array is used to reconstruct the data on the failed storage device and write that data to a new storage device. However, the density of storage devices is very high (e.g., on the order of Terabytes). As a result, the time to rebuild a storage device can be very high.

BRIEF DESCRIPTION OF THE DRAWINGS

The embodiments described herein will be understood more fully from the detailed description given below and from the accompanying drawings.

DETAILED DESCRIPTION

Figure 1:
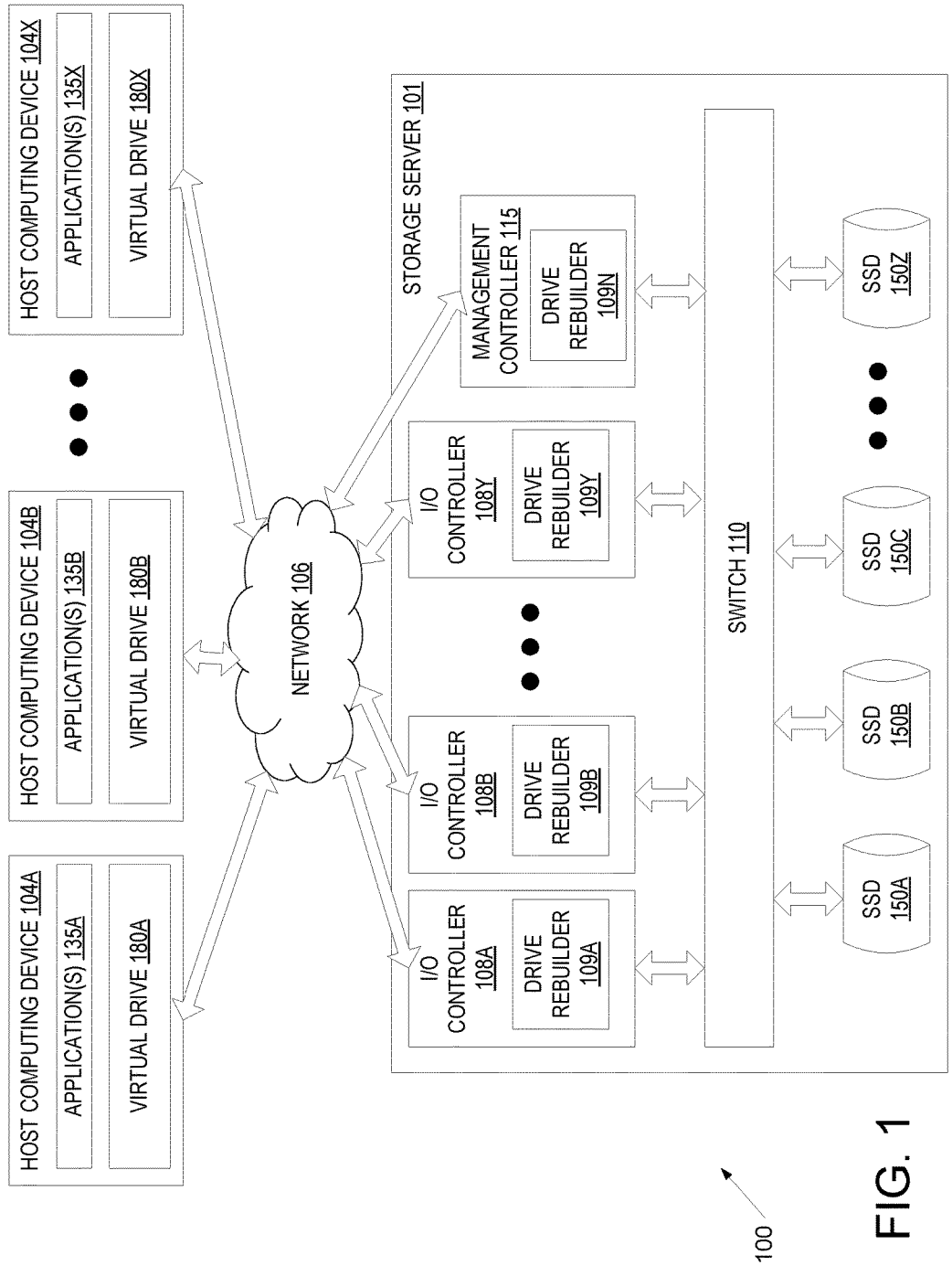
FIG. 1 is a block diagram example of a network architecture, in which embodiments described herein may operate.

Described herein are embodiments of a storage server with a distributed controller architecture that is capable of performing a distributed rebuild of a failed storage device. Also described are methods of performing a distributed rebuild of a failed storage device.

Typical storage array architectures have a single input/output controller connected to multiple storage devices (also referred to as drives). Typically, the storage devices' bandwidth to perform input/output (I/O) operations is much higher than the I/O controller's bandwidth. In the case of recovery of a failed storage device, each of the other storage devices in the storage array is read by the single I/O controller. The read data is then used to compute the data in the failed storage device in order to recover lost data from the failed storage device. A bottleneck in storage array architectures is the compute capacity of the single I/O controller. To recover a failed storage device, the single I/O controller performs read operations on multiple storage devices, performs computations to recompute the data from the failed storage device, and performs write operations to write the recomputed data to a new storage device. This can render the storage array unusable for standard read and write operations during the recovery process.

Alternatively, during the recovery process normal read and write operations may continue. However, this means that the single I/O controller performs all the backend reads to the storage devices necessary for recovery using whatever capacity that is left after satisfying the read and write operations. As a result, the time to recover a failed storage device can be on the order of 24 hours to days. Moreover, as the data density of storage devices increases, the rebuild time is further increased. This becomes problematic if the mean time between drive failures is less than the recovery time, as a separate drive that is involved in the recovery process may fail before a previously failed drive is completely rebuilt.

Embodiments provide a storage server having a storage array architecture in which multiple I/O controllers are connected to multiple storage devices arranged in a redundant array via a switch (or multiple switches). Accordingly, more than one I/O controller may have access to all of the drives in the storage array, and may satisfy read and write requests to the storage array. The average drive failure rate is the same for a given storage array regardless of the number of I/O controllers that have access to that storage array. Accordingly, by dividing the work of rebuilding a failed storage device across the multiple I/O controllers, the time to perform the recovery process can be considerably reduced. Since the I/O bandwidth for the drives is considerably higher than the bandwidth of the I/O controllers, the recovery process can be sped up by a factor that is approximately equal to the number of I/O controllers in embodiments. For example, if 10 I/O controllers are used, then the recovery and rebuild process can be completed in $\frac{1}{10}^{th}$ the standard time. Moreover, the recovery of the failed storage device may be performed without negatively impacting read/write operations from host computing devices. For example, each of the I/O controllers may dedicate a first portion of their resources to rebuilding the failed storage device while reserving a second portion of their resources to servicing read/write requests.

In one embodiment, a processing device (e.g., an I/O controller or management controller) determines that a storage device in a redundant storage array has failed. The processing device may determine that multiple input/output (I/O) controllers have access to the storage device. The processing device, the I/O controllers and the redundant storage array may be components of a storage server. The processing device determines a first portion of the storage device to be recovered by a first I/O controller and determines a second portion of the storage device to be recovered by a second I/O controller. The first I/O controller recovers the first portion of the storage device in parallel to the second I/O controller recovering the second portion of the storage device. Additionally, one or more other I/O controllers may also recover other portions of the failed storage device concurrently. As a result, the total recovery time for the failed storage device can be significantly reduced. Additionally, each of the I/O controllers may service read/write requests concurrent to performing recovery operations without impacting performance. Accordingly, the storage server in embodiments is able to quickly rebuild a failed storage device without negatively impacting the ability of any of the I/O controllers to service read/write requests from clients.

FIG. 1 is a block diagram example of a data center network architecture 100, in which embodiments described herein may operate. The data center network architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A, 135B through 135X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C through 150Z of storage server 101) or to another logical storage address space (which in turn may be mapped to the physical storage address spaces of the multiple storage devices).

Storage server 101 is a computing device that is configured and optimized to provide storage to remote computing devices (e.g., to host computing devices 104A-X). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Storage server 101 includes multiple I/O controllers 108A, 108B through 108Y connected to multiple solid state drives (SSDs) 150A, 150B, 150C through 150Z via a switch 110. The SSDs 150A-Z may be SAS/SATA drives, non-volatile memory express (NVMe) drives, small computer system interface (SCSI) over PCIe (SOP) drives, or solid state drives that communicate using different protocols. NVMe drives are PCIe-based solid state storage devices that use the NVMe protocol. NVMe is a scalable host controller interface for PCIe-based solid state drives, which is based on a paired submission and completion queue mechanism. For NVMe, commands are placed by hosts into a submission queue. Completions are placed into an associated completion queue by the host controller. The number of SSDs included in storage server 101 may be less than 10 to more than 100. The solid state drives may have the same or different storage capacities.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to switch 110 via an internal bus. In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and performs input/output (I/O) operations (e.g., read operations and write operations) to satisfy input/output (I/O) commands or requests for those host computing devices. Applications 135A-X running on a host computing device 104A-X may attempt to read data from and/or write data to a virtual drive 180A-X that the host computing device 104A-X has access to. Responsive to such a read or write request, the host computing device 104A-X encapsulates a read or write command into a message (e.g., into an Ethernet packet) and sends the message to the I/O controller 108A-Y that is assigned to that host computing device 104A-X. The read and write commands are each I/O commands (also referred to as I/O requests).

When the I/O controller 108A-Y receives the read or write command from the host computing device 104A-X, the I/O controller 108A-Y extracts the read or write command from the message and determines what logical addresses of the virtual drive 180A-X should be used to write the data to or read the data from. The I/O controller 108A-Y may additionally translate the logical addresses of the virtual drive to physical addresses of the SSDs 150A-Z. For example, if a read command was received, the I/O controller 108A-Y may determine which SSDs 150A-Z store the information to be read as well as which physical addresses on those SSDs the data should be read from. In another example, if a write command was received, the I/O controller 108A-Y may determine which SSDs 150A-Z to write portions of received data to as well as which physical addresses of those SSDs 150A-Z to write the data to. The I/O controller 108A-Y may then generate one or more commands (e.g., NVMe commands) directed to the determined SSDs 150A-Z to write data to those SSDs or read data from those SSDs 150A-Z.

I/O controllers 108A-Y may each include a drive rebuilder 109A-Y. The drive rebuilder 109A-Y is responsible for recovering data from failed SSDs 150A-Z and/or rebuilding failed SSDs 150A-Z. I/O controllers 108A-Y may include array configuration information for the SSDs 150A-Z, and may use the array configuration information to reconstruct data of one or more virtual drives 180A-X if one or more of the SSDs 150A-Z becomes unavailable. For example, if a read command is received while one or more SSDs 150A-Z are unavailable, drive rebuilder 109A-Y may use the array configuration information to determine additional data to retrieve from other SSDs that is usable to recover the data on the failed SSD. The drive rebuilder 109A-Y may then retrieve the data from the available SSDs and then reconstruct missing data that is stored by the unavailable SSD (or unavailable SSDs) from the retrieved data. I/O controller 108A-Y may then satisfy the read command using the reconstructed data.

The drive rebuilders 109A-Y may additionally rebuild the data from a failed SSD and write the rebuilt data to a new SSD. This rebuild process may be divided among the drive rebuilders 109A-Y of multiple I/O controllers 108A-Y. For example, drive rebuilder 109A may determine that SSD 150A has failed, and may divide the rebuild process into multiple different tasks. Each task may be to rebuild a particular portion of the failed SSD. Drive rebuilder 109A may then communicate with drive rebuilders 109B-Y to assign each of those drive rebuilders a different task to rebuild a portion of the failed SSD 150A. Each drive rebuilder 109A-Y may then perform reads on SSDs 150B-Z and then perform data recovery calculations using the retrieved data to compute the portion of the failed SSD indicated in a particular task. The recomputed portion of the failed SSD may then be written by that drive rebuilder to the new SSD.

Switch 110 is a multi-port bridge that connects I/O controllers 108A-Y to SSDs 150A-Z. Switch 110 manages the flow of data within storage server 101 by connecting specific I/O controllers 108A-Y to specific SSDs 150A-Z on a message by message basis, allowing the switch 110 to regulate the flow of traffic. Each I/O controller 108A-Y and each SSD 150A-Z connected to switch 110 can be identified using a unique address (e.g., a unique port address) of the I/O controller or SSD. Switch 110 may be a PCIe switch, an Ethernet switch, a SAS or SATA expander, a USB switch, or other type of switch.

Each solid state drive (SSD) 150A-Z (also referred to as a solid state storage device) is a non-volatile storage device that uses integrated circuits to persistently store data. SSDs 150A-Z have numerous advantages over traditional disk drives. As compared to disk drives, SSDs are more resilient, consume less power, and have lower latency (access times). In one embodiment, SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. SSDs 150A-Z may include one or more ports (e.g., PCIe ports) to connect to switch 110. SSDs 150A-Z may connect to switch 110 via PCIe, SCSI, SAS, USB, or other connection protocols. In one embodiment, SSDs 150A-Z are NVMe drives.

Each SSD 150A-Z has a controller and a storage area that includes memory (e.g., NAND Flash non-volatile memory) to store data. The storage area is divided into memory pages, which is the smallest unit of storage to which data may be stored. Memory pages may have sizes based on a configuration of an SSD. For example, SSDs 150A-Z may have memory pages that are 4 kilobytes (kB), 8 kB or 16 kB. However, other memory page sizes are also possible. Memory pages are grouped into blocks. Each block contains a particular number of memory pages, which is again dependent on a design of a particular SSD. Typical SSDs have blocks that include 256 memory pages.

Storage server 101 additionally includes a management controller 115. Management controller 115 may be a device configured to perform particular operations with regards to management of the array of SSDs 150A-Z. Management controller 115 may include a processing device, a port for connecting to switch 110 and a NIC for connecting to network 106. Management controller 115 may additionally include a volatile and/or non-volatile memory to store firmware and/or software for performing operations described herein. In one embodiment, management controller 115 is a SoC.

The management controller 115 is responsible for managing the I/O controllers 108A-Y and the redundant array of SSDs 150A-Z. Management controller 115 determines how to configure the array of SSDs 150A-Z and further determines configurations for the one or more virtual drives 180A-X. For example, management controller 115 may determine which virtual drives map to which physical SSDs and which portions of those SSDs the virtual drives map to. Once these configurations are determined, management controller 115 may send these configurations to the I/O controllers 108A-Y for implementation. Management controller 115 additionally performs discovery operations and may be responsible for paring I/O controllers 108A-Y with host computing devices 104A-X. Discovery operations may be initiated when storage server 101 powers on and/or to connect host computing devices to new or updated virtual drives.

In one embodiment, management controller 115 includes a drive rebuilder 109N. Drive rebuilder 109N may perform some or all of the same operations as described with reference to drive rebuilders 109A-Y. In one embodiment, once an I/O controller 108A-Y identifies a failed SSD, that I/O controller notifies management controller 115. The drive rebuilder 109N of the management controller 115 may then coordinate recovery of the failed SSD among the I/O controllers 109A-Y. Alternatively, an I/O controller (e.g., that detects the failed SSD) may manage and coordinate recovery, and may assign rebuild tasks to drive rebuilder 109N in the same manner that rebuild tasks are assigned to other drive rebuilders 109A-Y.

Figure 2A:
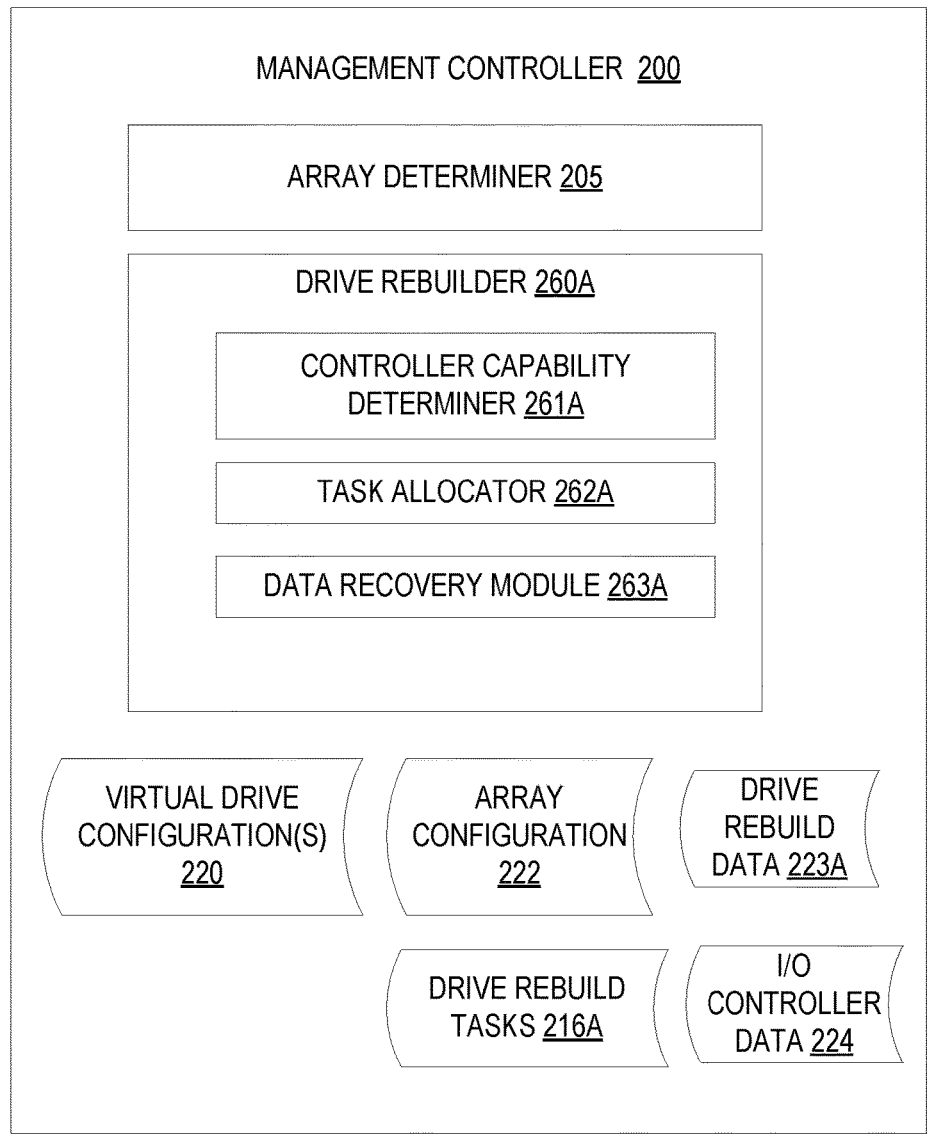
FIG. 2A is a block diagram of one embodiment of a management controller.

FIG. 2A is a block diagram of one embodiment of a management controller 200 showing logical modules that may be loaded into and executed by a processing device of management controller 200. Alternatively, management controller 200 may include one or more physical modules (e.g., an integrated circuit (IC) designed with described modules or a configurable logic such as a field programmable gate array (FPGA) configured to have the modules). In one embodiment, management controller 200 includes the modules of an array determiner 205 and a drive rebuilder 260A. Alternatively, the functionality of the array determiner 205 and/or driver rebuilder 260A may be divided into additional modules or may be combined into a single module. In one embodiment, management controller 200 corresponds to management controller 115 of FIG. 1.

Array determiner 205 identifies available storage devices and may determine how those storage devices are to be configured into a redundant storage array, and may store such information as array configuration 222. Array determiner 205 additionally determines how to divide the array of storage devices into virtual drives (e.g., into virtual NVMe drives), and this information may be included in virtual drive configuration(s) 220. Array determiner 205 may determine how many virtual drives to create, the sizes of those virtual drives, and what physical addresses of the storage devices to allocate to each virtual drive. Once the configurations for the virtual drives are determined, array determiner 205 sends the virtual drive configurations 220 to I/O controllers. The I/O controllers may then use the received virtual drive configurations 220 to establish and maintain the virtual drives.

Driver rebuilder 260A may be responsible for managing and coordinating a distributed rebuild of a failed storage device and/or may participate in the distributed rebuild of a failed storage device. In one embodiment, drive rebuilder 260A includes a controller capability determiner 261A, a task allocator 262A and a data recovery module 263A. At any time, management controller 200 may detect that a storage device in a storage array has failed. The management controller 200 may detect the failed storage device responsive to information or lack of information received from the storage device itself (e.g., via control signals between the management controller and storage device). Alternatively, the management controller 200 may receive a notice from an I/O controller that the storage device has failed.

Responsive to management controller 200 determining that a storage device has failed, controller capability determiner 261A may determine the credentials and/or capabilities of one or more I/O controllers managed by management controller 200. The credentials and/or capabilities of the I/O controllers may be determined based on stored I/O controller data 224 and/or based on querying the I/O controllers. Determined credentials may include information identifying whether particular I/O controllers have permission to access the failed storage device and/or a zone of the storage array that includes the failed storage device. Determined capabilities may include processing resources (e.g., a number of processing devices, a number of cores in the processing devices, a speed of the processing devices, etc.), memory resources (e.g., amount of volatile memory), and/or current amount of available bandwidth (e.g., the current number of I/O operations that are queued).

Task allocator 262A divides the process of rebuilding the failed storage device into a collection of drive rebuild tasks 216A. Each drive rebuild task may be to rebuild a particular portion or portions of the failed storage device and/or to write the data for the rebuilt portion or portions of the failed storage device to a new storage device. For example, a drive rebuild task may indicate that data at a particular address range on the failed storage device is to be rebuilt. The task allocator 262A may then allocate the determined drive rebuild tasks to the I/O controllers, and may maintain drive rebuild data 223A to keep track of which drive rebuild tasks have been allocated to which I/O controllers. Drive rebuild data 223A may be a list, table, file or other data structure that may identify which drive rebuild tasks have been assigned to which controllers, which drive rebuild tasks have been completed, which portions of the failed storage device still need to be recovered, and/or which portions of the failed storage device have already been recovered. As I/O controllers complete drive rebuild tasks, they may report the completion to drive rebuilder 260A, and drive rebuilder 260A may update the drive rebuild data 223A accordingly.

In one embodiment, all of the I/O controllers have access to the failed storage device. Alternatively, some I/O controllers may have access to a zone of the storage array containing the failed storage device, and other I/O controllers may not have access to the zone of the storage array containing the failed storage device. In such an embodiment, fewer than all of the I/O controllers may be available to assist in recovery of the failed storage device. In another embodiment, the failed storage device may be divided into multiple zones. A first set of I/O controllers may have access to a first portion of the failed storage device that is associated with a first zone, and a second set of I/O controllers may have access to a second portion of the failed storage device that is associated with a second zone. In such an implementation, first drive rebuild tasks for rebuilding the first portion of the failed storage device may be divided between the first set of I/O controllers, and second drive rebuild tasks for rebuilding the second portion of the failed storage device may be divided between the second set of I/O controllers.

In one embodiment, each I/O controller that has permission to access the zone (or zones) of the storage array containing the failed storage device is assigned an approximately equal amount of work (e.g., the same amount of data to recover). Alternatively, the drive rebuild tasks may be assigned to the I/O controllers based on the capabilities of those controllers. Thus, some I/O controllers may be assigned a greater amount of work than other I/O controllers. For example, an I/O controller with greater processing resources and/or greater memory resources may be assigned to rebuild a greater amount of data than another I/O controller with lower processing resources and/or lower memory resources. Additionally, an I/O controller that is idle may be assigned to rebuild a greater amount of data than another I/O controller that is actively servicing numerous read and write requests.

In one embodiment, all of the drive rebuild tasks are assigned up front before any of the I/O controllers begins to rebuild the failed storage device. Alternatively, task allocator 262A may assign drive rebuild tasks progressively. For example, task allocator 262A may assign one or a few drive rebuild tasks to an I/O controller at a time. Once an I/O controller completes a particular drive rebuild task or tasks that it has been assigned, that I/O controller may notify drive rebuilder 261A of the completed rebuild task, and task allocator 262A may assign another drive rebuild task to that I/O controller. This process may continue until the failed storage device has been completely rebuilt. In one embodiment, as I/O controllers complete drive rebuild tasks, they add entries to drive rebuild data 223A indicating that those drive rebuild tasks are complete. Alternatively, the I/O controllers may report the completion of the drive rebuild tasks to drive rebuilder 260A, which may then update the drive rebuild data 223A.

Additionally, if an I/O controller rebuilds any portion of the failed storage device responsive to a read request, that I/O controller may write the data for the rebuilt portion to the new storage device and record an entry in the drive rebuild data 223A indicating the rebuilt portion. Such rebuilt data may be at random locations in the failed storage device. Accordingly, task allocator 262A may read the drive rebuild data 223A before assigning new drive rebuild tasks. Task allocator 262A may then ensure that assigned tasks are to rebuild portions of the storage device that have not previously been rebuilt.

In one embodiment, data recovery module 263A performs operations to satisfy an assigned drive rebuild task. This may include reading data from multiple available storage devices on a storage array that includes the failed storage device (e.g., encodings usable to recreate data on the failed storage device). This may further include performing computations using the retrieved encodings to determine the data at the failed storage device and writing the determined data to a new storage device.

Figure 2B:
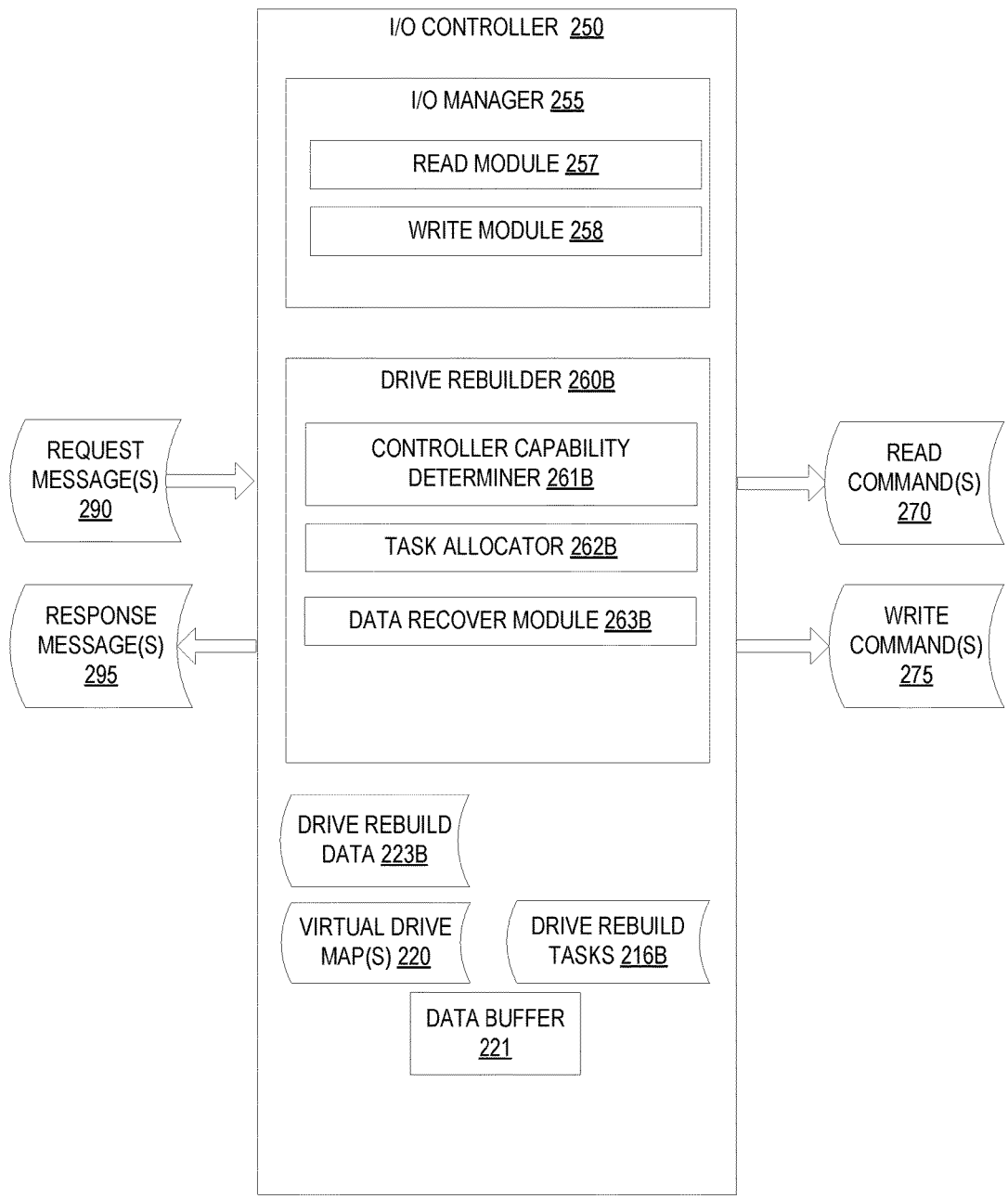
FIG. 2B is a block diagram of one embodiment of an input/output controller.

FIG. 2B is a block diagram of one embodiment of a I/O controller 250 showing logical modules that may be loaded into and executed by a processing device of I/O controller 250. Alternatively, management controller 250 may include one or more physical modules (e.g., an integrated circuit (IC) designed with described modules or a configurable logic such as a field programmable gate array (FPGA) configured to have the modules). In one embodiment, I/O controller 250 includes the module of an input/output (I/O) manager 255. The I/O manager 255 in one embodiment includes a read module 257 and a write module 258. In one embodiment, I/O controller 250 corresponds to I/O controllers 108A-Y of FIG. 1.

I/O manager 255 is responsible for communicating with host computing devices and satisfying input/output (I/O) commands such as read commands and write commands from the host computing devices. I/O controller 250 receives request messages 290 from host computing devices. The messages may be, for example, Ethernet packets. The received request messages 290 may contain I/O commands encapsulated in the messages and/or data encapsulated in the request messages 290. Responsive to receipt of a message from a host, I/O manager 255 may remove an I/O command and/or data from the message and determine which module 257-258 should handle the data or I/O command.

In one embodiment, each of the request messages 290 is an Ethernet packet having a particular format and encapsulating an I/O command. The Ethernet packet may include a transport header identifying a destination address (e.g., a destination MAC address), a source address (e.g., a source MAC address), and a virtual local area network (VLAN) tag (if appropriate). A payload of the Ethernet packet may include a command payload and/or a data payload. The data payload includes data to be written to storage or data that has been retrieved from storage.

Responsive to receipt of a read command, I/O manager 255 invokes read module 257. Read module 257 is responsible for responding to read commands. In one embodiment, the command payload of the read command identifies specific logical block addresses of a virtual drive (e.g., a virtual NVMe drive) from which data is to be read. For example, the command payload may identify a particular logical block address and a length. Read module 257 may use a virtual drive map 220 for the virtual drive to determine what locations (e.g., what memory pages) on the physical storage devices (e.g., physical NVMe drives) correspond to the logical block addresses of the virtual drive.

Read module 257 may then generate read commands 270 for each of the storage devices storing data to be read. For example, if a virtual drive maps to three physical SSDs, read module 257 may determine first memory pages on a first SSD storing requested information, second memory pages on a second SSD storing requested information and third memory pages on a third SSD storing requested information. Read module 257 may then generate a first read command directed to the first memory pages of the first SSD, a second read command directed to the second memory pages of the second SSD, and a third read command directed to the third memory pages of the third SSD. The read commands may be placed into I/O submission queues for each of the drives that are managed by the I/O manager. Once a read command 270 reaches the front of an I/O submission queue, read module 257 may then send the generated read command 270 to the appropriate SSD.

The SSDs receive the read commands and return data stored at indicated memory locations. The returned data is added to a data buffer 221 by read module 257 until the data buffer 221 fills or all requested data has been received. In one embodiment, the data buffer 221 has a size that corresponds approximately to a maximum allowed size of an Ethernet packet. Once the data buffer 221 fills, read module 257 may generate a response message 295 (e.g., a new Ethernet packet having the above identified format). Read module 257 may then encapsulate the data from the data buffer 221 into the response message 295. For example, read module 257 may generate an Ethernet packet with a transport header indicating the MAC addresses of the requesting host device and of the I/O controller 250. The Ethernet packet may also include a data payload with the data from the data buffer 221. Read module 257 may then send the response message 295 to the host. Read module 257 may continue to create and send response messages incorporating retrieved data as the data buffer 221 fills.

In one embodiment, responsive to receipt of a write command, I/O manager 255 invokes write module 258. Write module 258 is responsible for responding to write commands. In one embodiment, the command payload of the write command identifies a length of data to be written. Write module 258 may determine what logical block addresses to write the data to, and may use the virtual drive map 220 for the virtual drive to determine what locations (e.g., what memory pages) on the physical storage devices (e.g., physical NVMe drives) correspond to the logical block addresses of the virtual drive. Alternatively, the logical block addresses (e.g., a starting logical block address and length) may be indicated in the write command.

Write module 258 may then generate write commands 275 for each of the storage devices to which the data will be written. The write commands may be placed into I/O submission queues for each of the SSDs that are managed by the I/O manager. Once a write command reaches the front of an I/O submission queue, write module 258 may then send the generated write command to the appropriate SSD.

In one embodiment, I/O controller 250 includes a drive rebuilder 260B. Drive rebuilder 260B may include a controller capability determiner 261B, a task allocator 262B and a data recovery module 263B. In one embodiment, drive rebuilder 260B and its sub-modules perform the same or similar operations as described with reference to drive rebuilder 260A and its sub-modules. For example, controller capability determiner 261B may determine the capabilities of other I/O controllers and/or of a management controller based on querying the I/O controllers and/or the management controller. The task allocator 262B may then generate drive rebuild tasks 261B and assign those drive rebuild tasks to itself, to other I/O controllers and/or to the management controller. Drive rebuilder 260B may add information to drive rebuild data 223B as portions of the failed storage device are received (e.g., as drive rebuild tasks 216B are completed). Data recovery module 263B may perform operations to satisfy an assigned drive rebuild task.

Notably, I/O controller 250 may perform recovery operations and I/O operations to satisfy I/O requests such as read/write requests concurrently without impacting performance. For example, an amount of recovery operations performed by the I/O controller 250 (e.g., a size for a portion of a failed drive that is recovered by the I/O controller 250) may be based on additional bandwidth that the I/O controller 250 has after satisfying all I/O requests from a host computing device. Thus, performing the recovery operations may not impose any delay on the servicing of the I/O requests.

Figure 3:
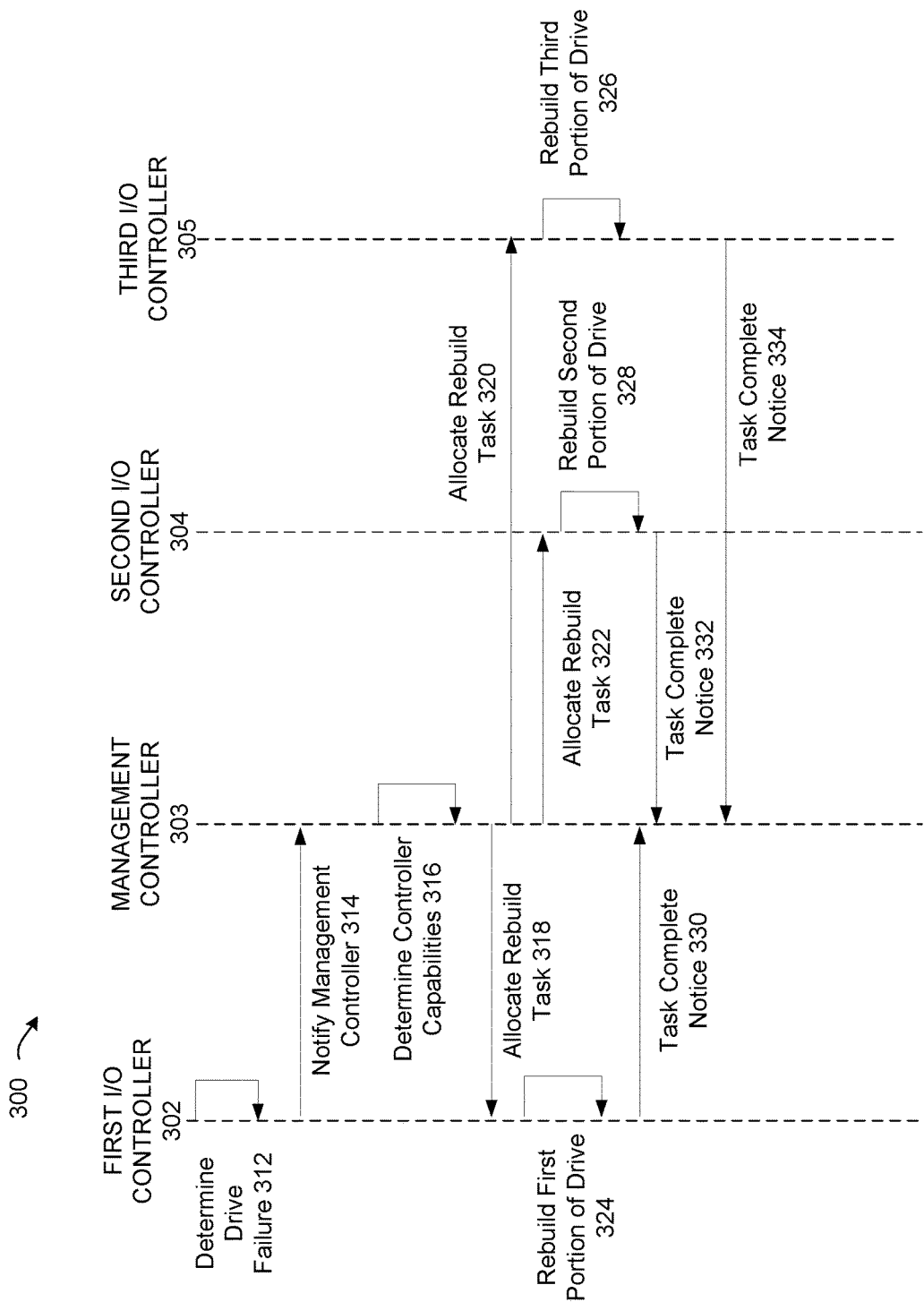
FIG. 3 is a sequence diagram showing a distributed rebuild of a failed storage device, in accordance with one embodiment.

FIG. 3 is a sequence diagram 300 showing a distributed rebuild of a failed storage device, in accordance with one embodiment. The sequence diagram 300 begins with a first I/O controller 302 determining that a drive (storage device) of a redundant storage array in a storage server has failed at operation 312. The first I/O controller 302 may determine that the drive has failed based on sending commands or other messages to the drive and failing to receive a response or by receiving an error response, for example. After determining that the drive has failed, first I/O controller 302 sends a notice 314 to management controller 303 that the drive has failed.

Responsive to receiving the drive failure notice from the first I/O controller 302, management controller 303 determines capabilities of available controllers that might contribute to rebuilding the failed drive at operation 316 (e.g., determines capabilities of first I/O controller 302, second I/O controller 304 and third I/O controller 305). After determining the controller capabilities, management controller 303 allocates a first rebuild task 318 to first I/O controller 303, allocates a second rebuild task 322 to second I/O controller 304, and allocates a third rebuild task 320 to third I/O controller 305. In parallel, each of the first I/O controller 302, second I/O controller 304 and third I/O controller 305 perform their assigned drive rebuild tasks. Specifically, first I/O controller 302 rebuilds a first portion of the drive at operation 324, second I/O controller 304 rebuilds a second portion of the drive at operation 328, and third I/O controller 305 rebuilds a third portion of the drive at operation 326.

As the different I/O controllers complete their assigned drive rebuild tasks, they send tack completion notices to the management controller informing the management controller that they have completed their assigned drive rebuild tasks. First I/O controller 302 sends task complete notice 330 to management controller 303 after rebuilding the first portion of the drive. Second I/O controller 304 sends task complete notice 332 to management controller 303 after rebuilding the second portion of the drive. Third I/O controller 305 sends task complete notice 334 to management controller 303 after rebuilding the third portion of the drive. Once all of the portions of the failed drive have been rebuilt and stored to a new drive, that new storage drive may be brought online and may replace the original failed drive.

Figure 4:
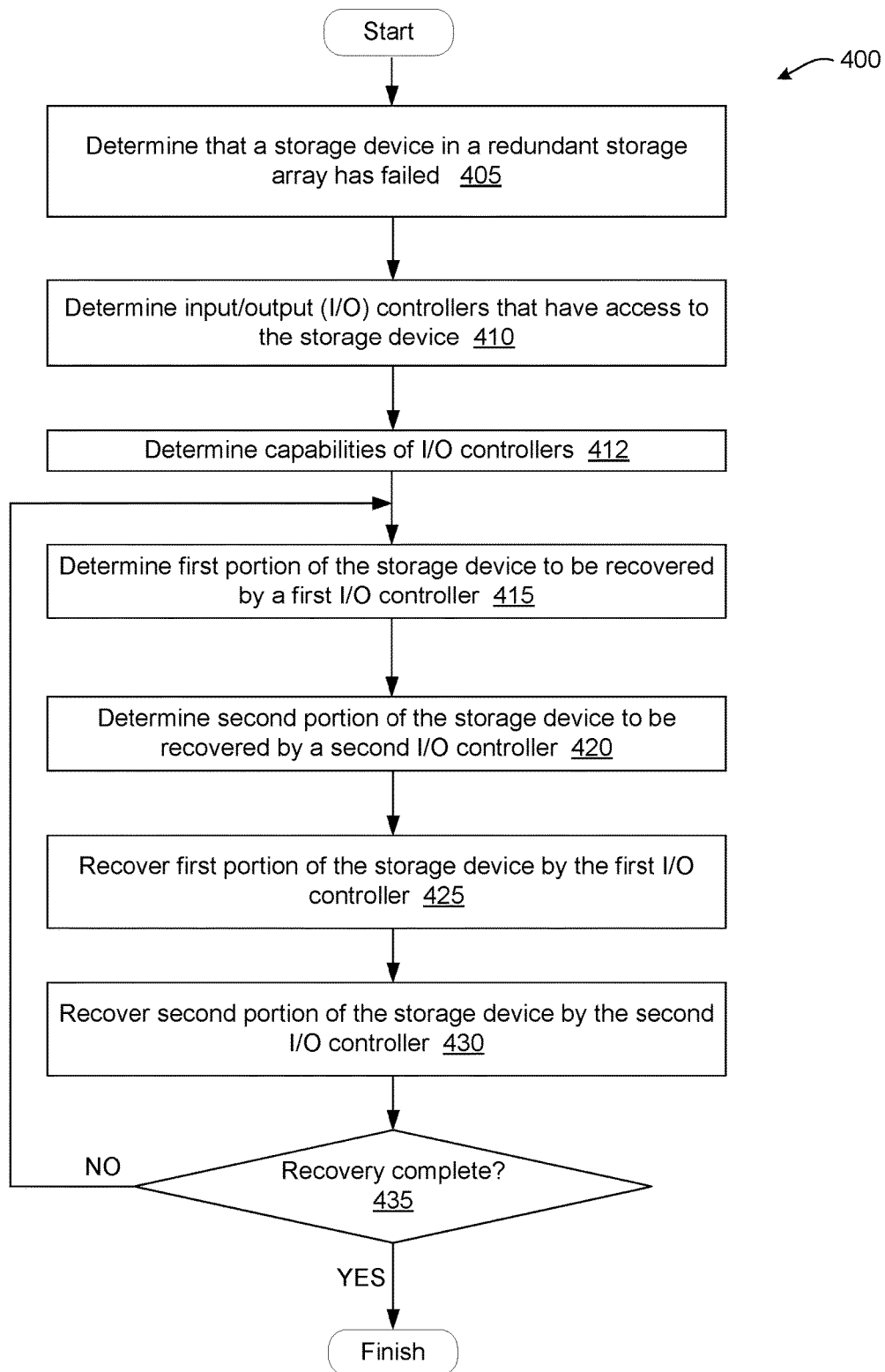
FIG. 4 is a flow diagram of one embodiment for a method of performing a distributed rebuild of a failed storage device.
Figure 5:
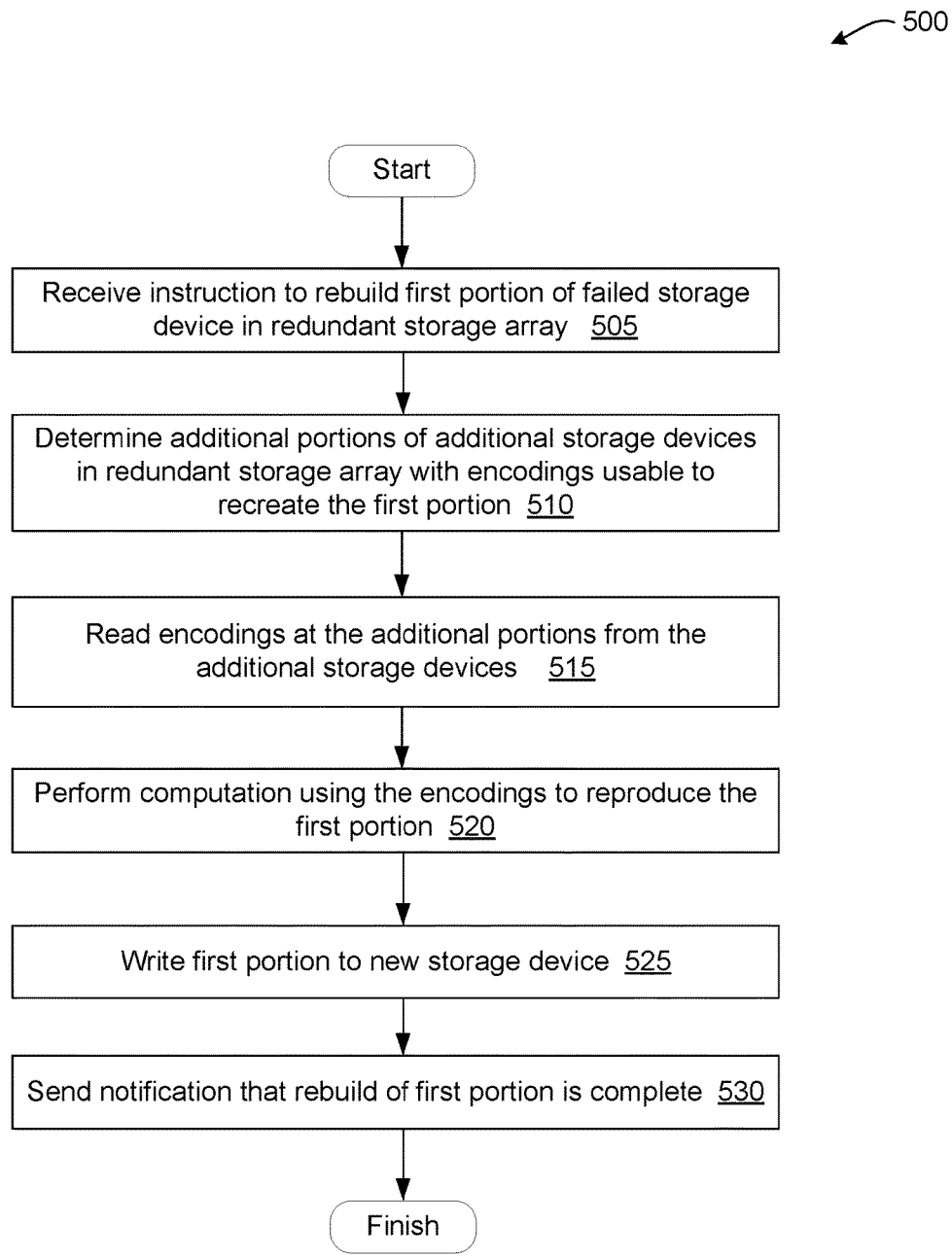
FIG. 5 is a flow diagram of one embodiment for a method of recovering a portion of a failed storage device.
Figure 6:
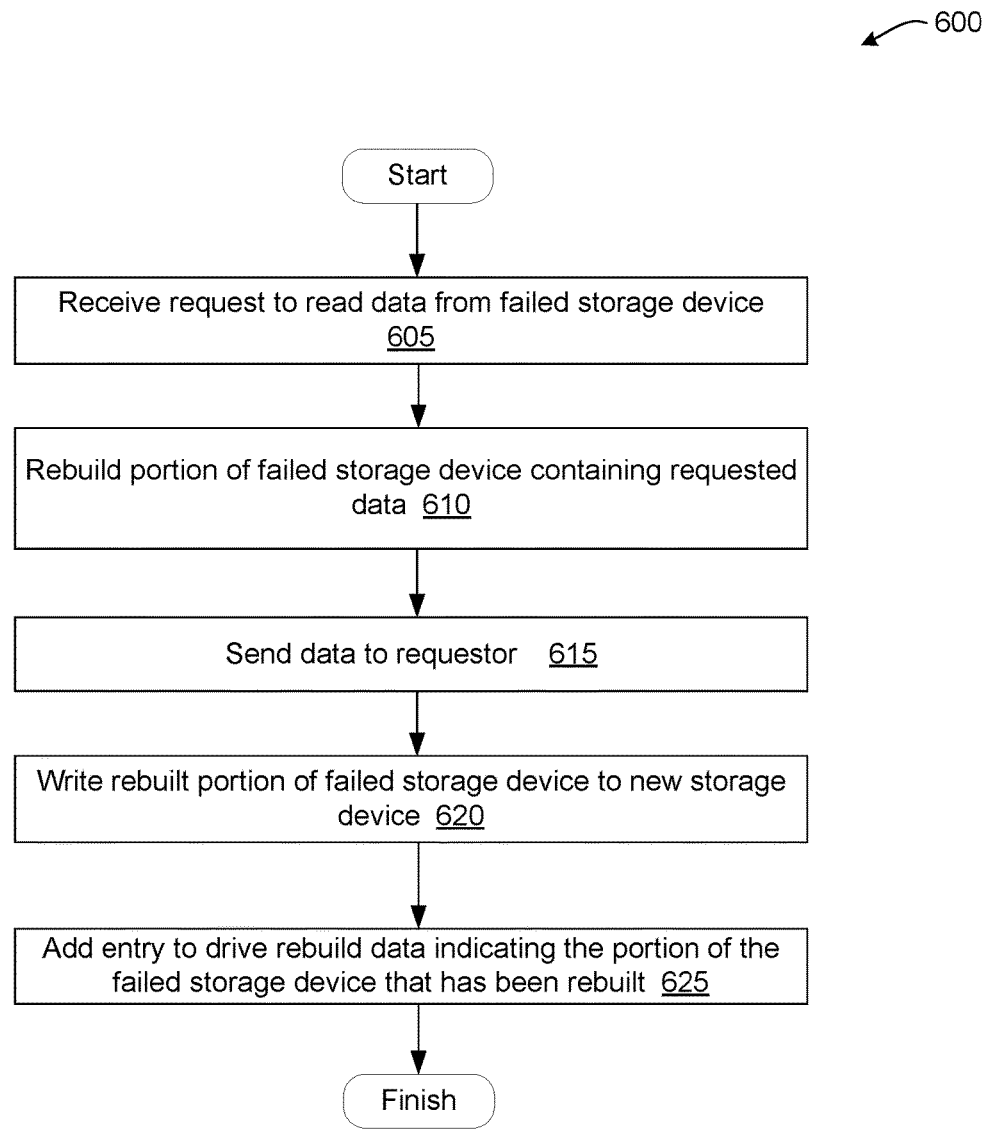
FIG. 6 is a flow diagram of one embodiment for a method of responding to a read request directed to a failed storage device.

FIGS. 4-6 are flow diagrams of various implementations of methods related to performing a distributed rebuild of a failed storage device in a redundant storage array. The methods are performed by processing logic that may include hardware (circuitry, dedicated logic, etc.), software (such as is run on a general purpose computer system or a dedicated machine), or a combination of both. Some methods may be performed by an I/O controller and/or a management controller, such as I/O controller 250 of FIG. 2B and/or management controller 200 of FIG. 2A. Accordingly, the processing logic that performs one or more operations of the methods may be on one or more I/O controllers and/or a management controller.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram of one embodiment for a method 400 of performing a distributed rebuild of a failed storage device. At block 405 of method 400, first processing logic determines that a storage device in a redundant storage array has failed. The first processing logic may be, for example, a first I/O controller of a storage server that includes a redundant storage array, and the failed storage device may be a part of the redundant storage array. At block 410, the first processing logic or a second processing logic determines I/O controllers that have access to the failed storage device. The second processing logic may be a management controller or another I/O controller. At block 412, the first or second processing logic determines capabilities of the I/O controllers determined at block 410.

At block 415, the first or second processing logic determines a first portion of the storage device to be recovered by a first I/O controller. The first I/O controller may be the first processing device in some instances. The first or second processing logic may then send a drive recovery task to the first I/O controller. Alternatively, if the first processing logic is the first I/O controller, then the first processing logic may place the drive recovery task in a queue of the first I/O controller for processing. At block 420, the first or second processing logic determines a second portion of the storage device to be recovered by a second I/O controller. The first or second processing logic may send a drive recovery task for recovering the second portion to the second I/O controller, which may place the drive recovery task in a queue of the second I/O controller.

At block 425, the first I/O controller recovers the first portion of the storage device. At block 430, the second I/O controller recovers the second portion of the storage device. Responsive to recovering their assigned portions of the storage device, the first and/or second I/O controller may send a notice to the first or second processing logic indicating that the assigned portion of the storage device has been recovered.

At block 435, the first or second processing logic determines whether recovery of the failed storage device is complete. If the recovery is not complete, the method returns to block 415, and additional drive recovery tasks are allocated to the first and/or second I/O controllers to cause complementary portions of the storage device to be recovered. If the recovery of the failed storage device is complete, then the method may end.

FIG. 5 is a flow diagram of one embodiment for a method 500 of recovering a portion of a failed storage device. At block 505 of method 500, processing logic receives an instruction to rebuild a first portion of a failed storage device in a redundant storage array. The processing logic may be an I/O controller or a management controller, and the instruction may be received from another I/O controller or from a management controller. The instruction may be a drive rebuild task identifying the portion of the storage device to be recovered. At block 510, processing logic determines complementary portions of additional storage devices in the redundant storage array with encodings that are usable to recreate the first portion of the failed storage device.

At block 515, processing logic reads encodings from the complementary portions of the additional storage devices. At block 520, processing logic performs one or more computations using the encodings to reproduce the first portion. For example, the redundant array may include X storage devices, where Y of those X storage devices store parity information. Data may be striped across the X minus Y storage devices, and the parity data may be written to the remaining Y storage devices. If drive A fails, then for a single stripe data may be read from the remaining storage devices. Drive A could be any of the X drives (e.g., may be a drive that holds original data for a stripe or a drive that holds parity information for the stripe). An operation such as an XOR operation may be performed using all surviving drives (e.g., all drives other than drive A) to recreate the data that was stored on storage device A. If Y (e.g., 2) parity drives are used, then the system tolerates up to Y concurrent drive failures. If one drive fails (or fewer than Y drives fail), then the surviving parity drives and data drives may be used to solve for the data on the failed drive.

At block 525, the recomputed first portion of the failed storage device is written to a new storage device. At block 530, a notification that the rebuild was successful may then be sent to another I/O controller or to a management controller.

FIG. 6 is a flow diagram of one embodiment for a method 600 of responding to a read request directed to a failed storage device. At block 605, processing logic (e.g., and I/O controller) receives a request to read data from a failed storage device. The request may be received from a remote host or other computing device. At block 610, processing logic rebuilds a portion of the failed storage device containing the requested data. This may include reading data from additional drives and performing computations as discussed above with reference to method 500. At block 615, processing logic sends the data from the rebuilt portion of the failed storage device to the requestor (e.g., to the remote host).

At block 620, processing logic writes the rebuilt portion of the failed storage device to a new storage device. At block 625, processing logic adds an entry to drive rebuild data indicating that the portion of the failed storage device has been rebuilt. Alternatively, or additionally, processing logic may determine a controller (e.g., an I/O controller or a management controller) that is managing rebuild of the failed storage device. The processing logic may then send a notice to the determined controller indicating that the portion of the failed storage device has been rebuilt. That controller may then add an entry to the drive rebuild data (which may be maintained by that controller) indicating that the portion of the failed storage device has been rebuilt. That may ensure that the controller does not assign a drive rebuild task to cause the rebuilt portion of the failed storage device to again be rebuilt.

Figure 7:
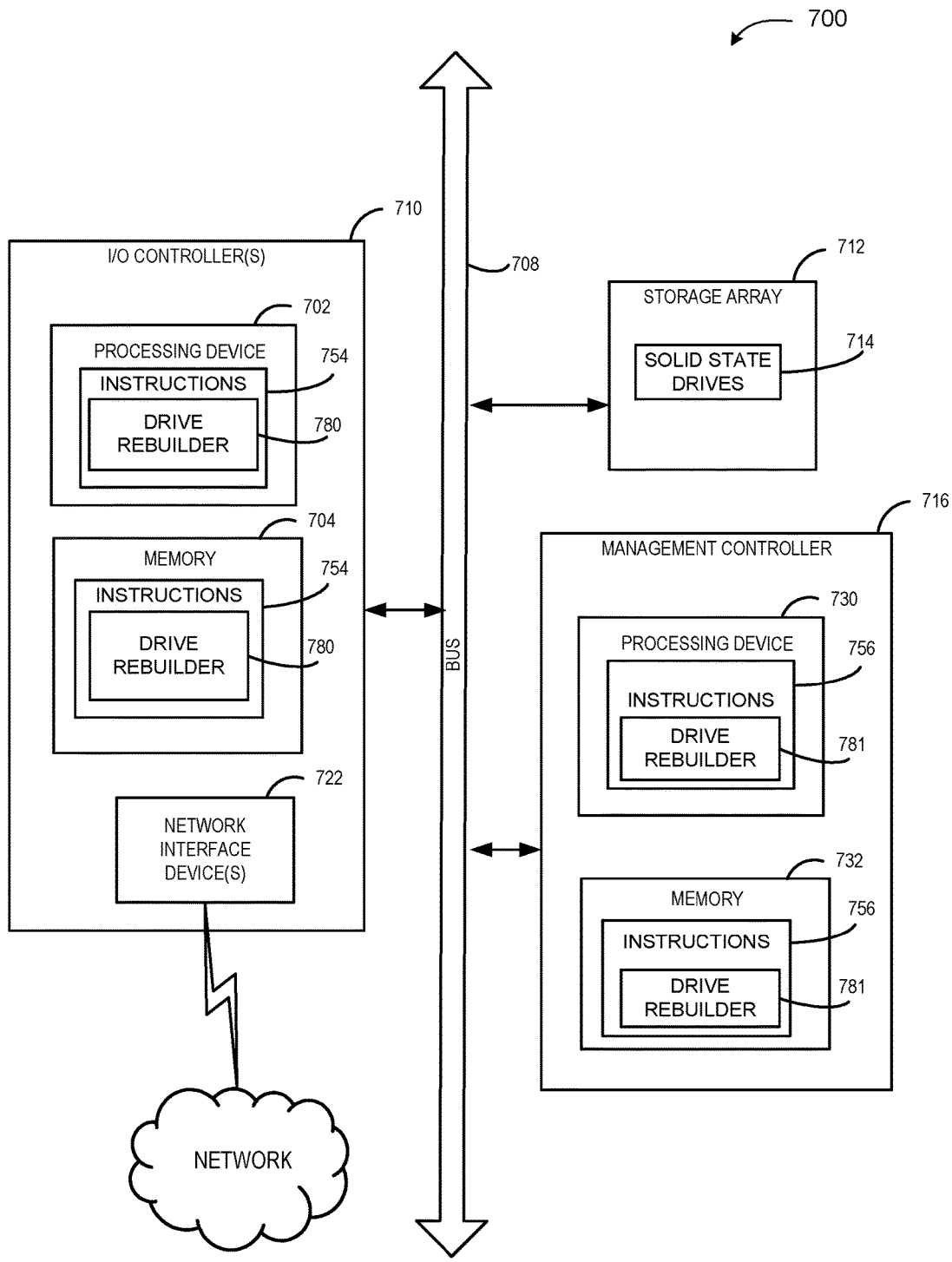
FIG. 7 illustrates an example computing device, in accordance with one embodiment.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a hardware storage server, and may provide storage to hosts using one or more of a storage area network (SAN) or network attached storage (NAS) methodology. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes one or more I/O controllers 710, a storage array 712, and a management controller 716 (or multiple management controllers 716), which communicate with each other via a bus 708. Bus 708 may include one or more switches (e.g., switch 110 of FIG. 1) and one or more transport fabrics (also referred to as backplane fabrics). Each transport fabric includes hardware (e.g., switches, etc.) that connects I/O controllers 710 to SSDs 714. Each transport fabric may include a fabric board (e.g., a printed circuit board (PCB) that includes multiple hardware components. Alternately, multiple transport fabrics may be part of a single backplane printed circuit board (PCB). Each transport fabric enables any I/O controller 710 to connect to any SSD 714. Each transport fabric may be independent of other transport fabrics, using its own hardware, ports, connections, etc. that are distinct from those used by the other transport fabrics. Accordingly, if any component in a transport fabric fails and causes that transport fabric to fail, the I/O controllers 710 may continue to maintain connections to the SSDs 714 via an alternative transport fabric.

Each I/O controller 710 represents a device configured to connect one or more host computing devices to one or more SSDs (e.g., I/O controller 108A-Y of FIG. 1). An I/O controller 710 includes a processing device 702, and a memory 704 (e.g., read-only memory (ROM), flash memory, dynamic random access memory (DRAM) such as synchronous DRAM (SDRAM) or Rambus DRAM (RDRAM), etc.). The memory 704 may include instructions 754 that may be loaded into processing device 702. The instructions 754 may include a drive rebuilder 780 (e.g., as described above with respect to FIGS. 1 and 2B), and/or a software library containing methods that call a drive rebuilder 780. The I/O controller 710 may further include one or more network interface devices 722 to connect to a network. In one embodiment, each I/O controller 710 is a system on a chip (SoC) including processing device 702, memory 704, and one or more network interface devices 722.

Management controller 716 represents a device configured to manage a transport fabric. Management controller 716 may include a memory 732 having instructions 756 and a processing device 730 that loads and executes those instructions 756. The instructions 756 may include a drive rebuilder 781 (e.g., as described above with respect to FIGS. 1 and 2A), and/or a software library containing methods that call a drive rebuilder 781. Memory 732 may be read-only memory (ROM), flash memory, dynamic random access memory (DRAM) such as synchronous DRAM (SDRAM) or Rambus DRAM (RDRAM), etc. In one embodiment, management controller 716 is a system on a chip (SoC) including processing device 730 and memory 732.

Processing device 702 and/or processing device 730 represent one or more general-purpose processors such as a microprocessor, central processing unit, or the like. More particularly, the processing device 702, 730 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702, 730 may also be one or more special-purpose processing devices such as an application specific integrated circuit (ASIC), a field programmable gate array (FPGA), a digital signal processor (DSP), network processor, or the like. Processing device 702, 730 is configured to execute processing logic (e.g., instructions 754, 756) for performing operations discussed herein.

The memory 704 and/or memory 732 may be a machine-readable storage medium (or more specifically a computer-readable storage medium) on which is stored one or more sets of instructions 754, 756 embodying any one or more of the methodologies or functions described herein. The instructions 754, 756 may also reside, completely or at least partially, within the processing device 702, 730 during execution thereof by the I/O controller 710 and/or management controller 716, the processing device 702, 730 also constituting computer-readable storage media. Alternatively, or additionally, the instructions 754, 756 may be resident on a solid state storage drive (e.g., a solid state storage drive 714) and/or a hard disk drive connected to bus 708.

While the computer-readable storage medium is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The storage array 712 represents a device that contains a group of solid state drives (SSDs) 714. Storage array 712 may arrange SSDs 714 into logical redundant storage containers, or a redundant array of independent disks (RAID). The storage array 712 may distribute data across the SSDs 714 in one of several RAID levels to provide different levels of redundancy and performance. In some implementations, storage array 712 may include one group of SSDs 714 for data and another group of SSDs 714 for recovery purposes. SSDs 714 may be SAS/SATA drives, non-volatile memory express (NVMe) drives, small computer system interface (SCSI) over PCIe (SOP) drives, or solid state drives that communicate using different protocols. The number of SSDs 714 included in storage array 712 may be less than 10 to more than 100. The SSDs 714 may have the same or different storage capacities.

The modules, components and other features described herein (for example in relation to FIGS. 2A-2B) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "reading", "determining", "recovering", "sending", "performing" or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, by a storage server comprising a redundant storage array, that a storage device in the redundant storage array has failed;
   determining a plurality of input/output (I/O) controllers of the storage server that have access to the storage device;
   allocating a plurality of drive rebuild tasks for rebuilding the storage device to two or more of the plurality of I/O controllers, wherein each drive rebuild task comprises at least one of a task to rebuild data at a portion of the storage device or a task to write data for the portion of the storage device to a new storage device in the redundant storage array;
   determining, based on a first drive rebuild task of the plurality of drive rebuild tasks, a first portion of the storage device to be recovered by a first I/O controller of the plurality of I/O controllers;
   determining, based on a second drive rebuild task of the plurality of drive rebuild tasks, a second portion of the storage device to be recovered by a second I/O controller of the plurality of I/O controllers;
   recovering, based on the first drive rebuild task of the plurality of drive rebuild tasks, the first portion of the storage device by the first I/O controller; and
   recovering, based on the second drive rebuild task of the plurality of drive rebuild tasks, the second portion of the storage device by the second I/O.

2. The method of claim 1, wherein recovering the first portion of the storage device comprises:
   determining complementary portions of a plurality of additional storage devices in the redundant storage array that comprise encodings usable to recreate the first portion;
   reading the encodings at the complementary portions from the plurality of additional storage devices;
   determining data stored at the first portion based on the encodings from the complementary portions; and
   writing the data to a new storage device.

3. The method of claim 1, wherein the first I/O controller recovers the first portion and the second I/O controller recovers the second portion in parallel.

4. The method of claim 1, further comprising:
   determining capabilities of each of the plurality of I/O controllers that have access to the storage device;
   determining the first portion of the storage device based on capabilities of the first I/O controller relative to capabilities of a remainder of the plurality of I/O controllers; and
   determining the second portion of the storage device based on capabilities of the second I/O controller relative to the capabilities of the remainder of the plurality of I/O controllers.

5. The method of claim 1, wherein:
   each of the plurality of I/O controllers comprises a system on a chip (SoC) comprising a processing device, a memory and a plurality of ports; and
   the storage server further comprises a switch, wherein the plurality of I/O controllers connect to the storage device via the switch.

6. The method of claim 1, further comprising:
   after the first I/O controller recovers the first portion of the storage device, performing the following comprising:
   determining a third portion of the storage device to be recovered by the first I/O controller; and
   recovering the third portion of the storage device by the first I/O controller.

7. The method of claim 1, further comprising:
   determining a third portion of the storage device to be recovered by a management controller, wherein the management controller comprises a system on a chip (SoC) configured to manage the plurality of I/O controllers and the redundant storage array.

8. The method of claim 1, further comprising:
   performing, by the first I/O controller, I/O operations that satisfy I/O requests concurrent to recovering the first portion of the storage device.

9. A storage server comprising:
   a plurality of storage devices arranged in a redundant storage array;
   a plurality of input/output (I/O) controllers that manage input/output operations to the plurality of storage devices; and
   a management controller that manages a configuration of the redundant storage array and that further manages the plurality of I/O controllers;
   wherein at least one of the management controller or an I/O controller of the plurality of I/O controllers is to:
   determine that a storage device in the redundant storage array has failed;
   determine a first I/O controller and a second I/O controller of the plurality of input/output (I/O) controllers that have access to the storage device;
   allocate a plurality of drive rebuild tasks for rebuilding the storage device to two or more of the plurality of I/O controllers, wherein each drive rebuild task comprises at least one of a task to rebuild data at a portion of the storage device or a task to write data for the portion of the storage device to a new storage device in the redundant storage array;
   determine, based on a first drive rebuild task of the plurality of drive rebuild tasks, a first portion of the storage device to be recovered by the first I/O controller; and
   determine, based on a second drive rebuild task of the plurality of drive rebuild tasks, a second portion of the storage device to be recovered by the second I/O controller;
   wherein the first I/O controller is to recover the first portion of the storage device based on the first drive rebuild task of the plurality of drive rebuild tasks; and
   wherein the second I/O controller is to recover the second portion of the storage device based on the second drive rebuild task of the plurality of drive rebuild tasks.

10. The storage server of claim 9, wherein to recover the first portion the first I/O controller is to:
    determine complementary portions of a plurality of additional storage devices in the redundant storage array that comprise encodings usable to recreate the first portion;
    read the encodings at the complementary portions from the plurality of additional storage devices;
    determine data stored at the first portion based on the encodings from the complementary portions; and write the data to a new storage device in the storage server.

11. The storage server of claim 9, wherein the first I/O controller is to recover the first portion and the second I/O controller is to recover the second portion in parallel.

12. The storage server of claim 9, wherein at least one of the management controller or the I/O controller is further to:
determine capabilities of each of the plurality of I/O controllers that have access to the storage device;
determine the first portion of the storage device based on capabilities of the first I/O controller relative to capabilities of a remainder of the plurality of I/O controllers; and
determine the second portion of the storage device based on capabilities of the second I/O controller relative to the capabilities of the remainder of the plurality of I/O controllers.

13. The storage server of claim 9, wherein each of the plurality of I/O controllers comprises a system on a chip (SoC) comprising a processing device, a memory and a plurality of ports.

14. The storage server of claim 9, wherein:
at least one of the management controller or the I/O controller is further to determine a third portion of the storage device to be recovered by the first I/O controller after the first I/O controller recovers the first portion of the storage device; and
the first I/O controller is further to recover the third portion of the storage device.

15. The storage server of claim 9, wherein:
at least one of the management controller or the I/O controller is further to determine a third portion of the storage device to be recovered by the management controller; and
the management controller is to recover the third portion of the storage device.

16. The storage server of claim 9, further comprising:
a switch connecting the plurality of I/O controllers to the plurality of storage devices.

17. The storage server of claim 9, wherein the first I/O controller is further to:
perform I/O operations that satisfy I/O requests concurrent to recovering the first portion of the storage device.

18. A computer readable storage medium having instructions that, when executed by a first controller of a storage server comprising a redundant storage array, cause the first controller to perform operations comprising:
determining, by the first controller, that a storage device in the redundant storage array has failed;
determining, by the first controller, a plurality of additional controllers of the storage server that have access to the storage device;
allocating a plurality of drive rebuild tasks for rebuilding the storage device to two or more of the plurality of additional controllers of the storage server that have access to the storage device, wherein each drive rebuild task comprises at least one of a task to rebuild data at a portion of the storage device or a task to write data for the portion of the storage device to a new storage device in the redundant storage array;
determining, based on a first drive rebuild task of the plurality of drive rebuild tasks, a first portion of the storage device to be recovered by a second controller of the plurality of additional controllers;
determining, based on a second drive rebuild task of the plurality of drive rebuild tasks, a second portion of the storage device to be recovered by a third controller of the plurality of additional controllers;
sending, based on the first drive rebuild task of the plurality of drive rebuild tasks, a first instruction to the second controller to cause the second controller to recover the first portion of the storage device; and
sending, based on the second drive rebuild task of the plurality of drive rebuild tasks, a second instruction to the third controller to cause the third controller to recover the second portion of the storage device.

19. The computer readable storage medium of claim 18, wherein the first controller is further to recover a third portion of the storage device by performing operations comprising:
determining complementary portions of a plurality of additional storage devices in the redundant storage array that comprise encodings usable to recreate the third portion;
reading the encodings at the complementary portions from the plurality of additional storage devices;
determining data stored at the third portion based on the encodings from the complementary portions; and
writing the data to a new storage device.

20. The computer readable storage medium of claim 18, wherein the second controller recovers the first portion and the third controller recovers the second portion in parallel.

21. The computer readable storage medium of claim 18, the operations further comprising:
determining capabilities of each of the plurality of additional I/O controllers that have access to the storage device;
determining the first portion of the storage device based on capabilities of the second controller relative to capabilities of a remainder of the plurality of additional controllers; and
determining the second portion of the storage device based on capabilities of the third controller relative to the capabilities of the remainder of the plurality of additional controllers.

22. The computer readable storage medium of claim 18, the operations further comprising:
after the second controller recovers the first portion of the storage device, determining a third portion of the storage device to be recovered by the second controller and sending an additional instruction to the second controller to cause the second controller to recover the third portion of the storage device.

* * * * *